United States Patent
Patil

(10) Patent No.: US 10,857,922 B2
(45) Date of Patent: Dec. 8, 2020

(54) MECHANISM FOR HOLDING AT LEAST ONE ARTICLE IN AN ENCLOSURE

(71) Applicant: FAURECIA INTERIOR SYSTEMS INDIA PRIVATE LIMITED, Pune (IN)

(72) Inventor: Hridaynath Patil, Pune (IN)

(73) Assignee: FAURECIA INTERIOR SYSTEMS INDIA PRIVATE LIMITED, Bhosari (IN)

( * ) Notice: Subject to any disclaimer, the term of this patent is extended or adjusted under 35 U.S.C. 154(b) by 638 days.

(21) Appl. No.: 15/591,561

(22) Filed: May 10, 2017

(65) Prior Publication Data
US 2017/0332816 A1 Nov. 23, 2017

(51) Int. Cl.
| B60N 3/10 | (2006.01) |
| A47G 23/02 | (2006.01) |
| B60N 2/75 | (2018.01) |
| B60R 7/04 | (2006.01) |

(52) U.S. Cl.
CPC ............. *B60N 3/102* (2013.01); *A47G 23/02* (2013.01); *A47G 23/0225* (2013.01); *B60N 2/793* (2018.02); *B60N 2/753* (2018.02); *B60N 2/777* (2018.02); *B60N 3/10* (2013.01); *B60R 7/04* (2013.01)

(58) Field of Classification Search
CPC ........ B60N 2/793; B60N 2/777; B60N 2/753; B60R 7/04
USPC ................... 296/37.8, 24.34; 220/350, 345.1
See application file for complete search history.

(56) References Cited

U.S. PATENT DOCUMENTS

| 6,059,243 | A | * | 5/2000 | Hikage | B60N 3/102 248/311.2 |
| 6,669,258 | B1 | * | 12/2003 | Kato | B60N 3/083 296/1.01 |
| 2003/0052129 | A1 | * | 3/2003 | Fukuo | B60N 3/102 220/350 |
| 2007/0024075 | A1 | * | 2/2007 | Nakamura | B60N 3/083 296/37.1 |
| 2009/0146444 | A1 | * | 6/2009 | Ichimaru | B60N 3/102 296/37.8 |
| 2010/0045060 | A1 | * | 2/2010 | Hipshier | B60R 13/0262 296/24.34 |
| 2010/0066113 | A1 | * | 3/2010 | Browne | B60R 7/04 296/24.34 |
| 2010/0066115 | A1 | * | 3/2010 | Hipshier | B60N 2/793 296/37.8 |
| 2011/0285163 | A1 | * | 11/2011 | Stueber | B60N 2/793 296/37.8 |
| 2015/0353142 | A1 | * | 12/2015 | Iriguchi | B60N 3/102 180/90 |

(Continued)

*Primary Examiner* — Fenn C Mathew
*Assistant Examiner* — Jennifer Castriotta
(74) *Attorney, Agent, or Firm* — Reising Ethington P.C.

(57) ABSTRACT

A mechanism for holding at least one article in an enclosure having a sliding cover. The mechanism includes a first track, a second track, and a third track configured on a wall of the enclosure. The third track is configured to hold the articles in a holding position. The mechanism further includes a track changing mechanism and a supporting link. The track changing mechanism connects the first track to the second track and to the third track. The supporting link supports and prevents the lateral movement of the article from the holding position.

11 Claims, 10 Drawing Sheets

(56) References Cited

U.S. PATENT DOCUMENTS

2016/0193967 A1* 7/2016 Hipshier .................. B60N 3/10
                                                        296/37.8
2018/0126918 A1* 5/2018 Yoshida .................... B60R 7/04

* cited by examiner

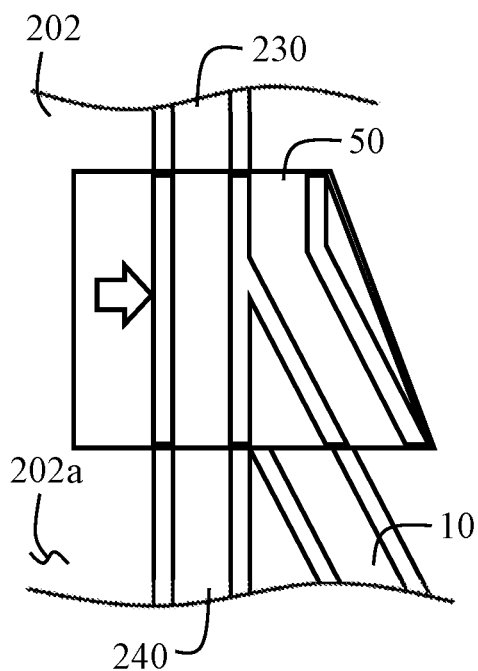
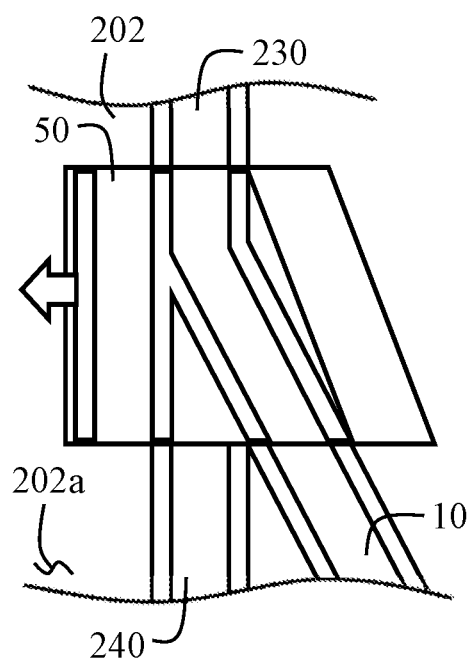
Figure 10
Figure 11
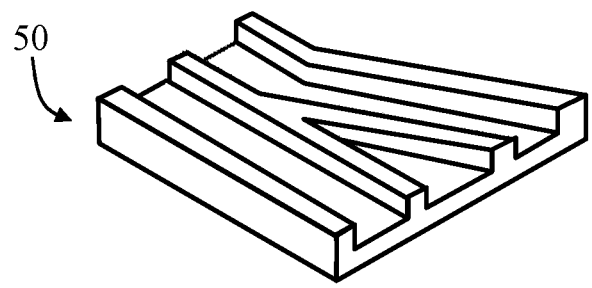
Figure 12

MECHANISM FOR HOLDING AT LEAST ONE ARTICLE IN AN ENCLOSURE

TECHNICAL FIELD

The present invention relates to a mechanism for holding articles. More specifically, the present invention relates to a mechanism for holding articles in an enclosure.

BACKGROUND

At present, a storage compartment with a detachable cup holder is used for storing articles as well as for holding cups in vehicles. The cup holder is provided on a top of the storage box and additional things can be kept inside the space below the cup holder. The cup holder provides as an extra storage along with the storage compartment. Moreover, the cup holder occupies more space in the storage box resulting in less storage capacity. In this arrangement, a user has to remove the cup holder outside the storage box every time to store articles therein. Also, the removed cup holder needs to placed elsewhere, which may cause misplacing or damage to the cup holder. This will create a lot of difficulties for the user.

Hence, there is a requirement of a storage compartment which can hold a cup without using storage space of the storage compartment.

SUMMARY

An object of the present invention is to provide a mechanism for holding articles in a sliding cover of an enclosure.

Another object of the present invention is to provide a mechanism, which reduces the time for storing articles in the enclosure.

Further object of the present invention is to provide a mechanism for holding at least one article in an enclosure, which utilizes maximum storage space of the enclosure.

Still another object of the present invention is to provide a mechanism for holding at least one article in an enclosure, which is easy to operate.

One more object of the present invention is to provide a mechanism for holding at least one article in an enclosure, which is easy to manufacture.

In accordance with one aspect of the invention, one or more of the above objects may be achieved by a mechanism for holding at least one article in an enclosure having a sliding cover, a first track, a second track and a third track configured on a wall of the enclosure. The third track is configured to hold the articles in a holding position. The mechanism further includes a track changing mechanism and a supporting link. The track changing mechanism connects the first track to the second track and to the third track. The track changing mechanism includes a track changing member for diverting the path of the sliding cover from the first track to the second track or to the third track. The track changing member is connected to a lever. The lever controls the movement of the track changing member. The supporting link supports and prevents the lateral movement of the article from the holding position. The supporting link includes a supporting member, an operating member and a connecting member. The supporting member and the operating member are connected to the connecting member. The sliding cover upon engaging with the operating member moves the supporting member from a retracted configuration to an extended configuration.

BRIEF DESCRIPTION OF DRAWINGS

The advantages and features of the present invention will be understood better with reference to the following detailed description and claims taken in conjunction with the accompanying drawings, wherein like elements are identified with like symbols, and in which:

FIG. 10 is a view of a track changing member as viewed along an inner side of a wall of the enclosure and in a position connecting a first track to a second track;

FIG. 11 is the same view as FIG. 10 with the track changing member moved to a position connecting the first track to a third track; and FIG. 12 is a perspective view of the track changing member of FIGS. 10 and 11.

DETAILED DESCRIPTION

An embodiment of this invention, illustrating its features, will now be described in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

The illustrated embodiment provides a mechanism for holding articles in a sliding cover of an enclosure. This embodiment provides a mechanism which reduces the time for storing articles in the enclosure, utilizes maximum storage space of the enclosure, and is easy to manufacture and operate.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

The disclosed embodiments are merely exemplary of the invention, which may be embodied in various forms.

Figure 1:
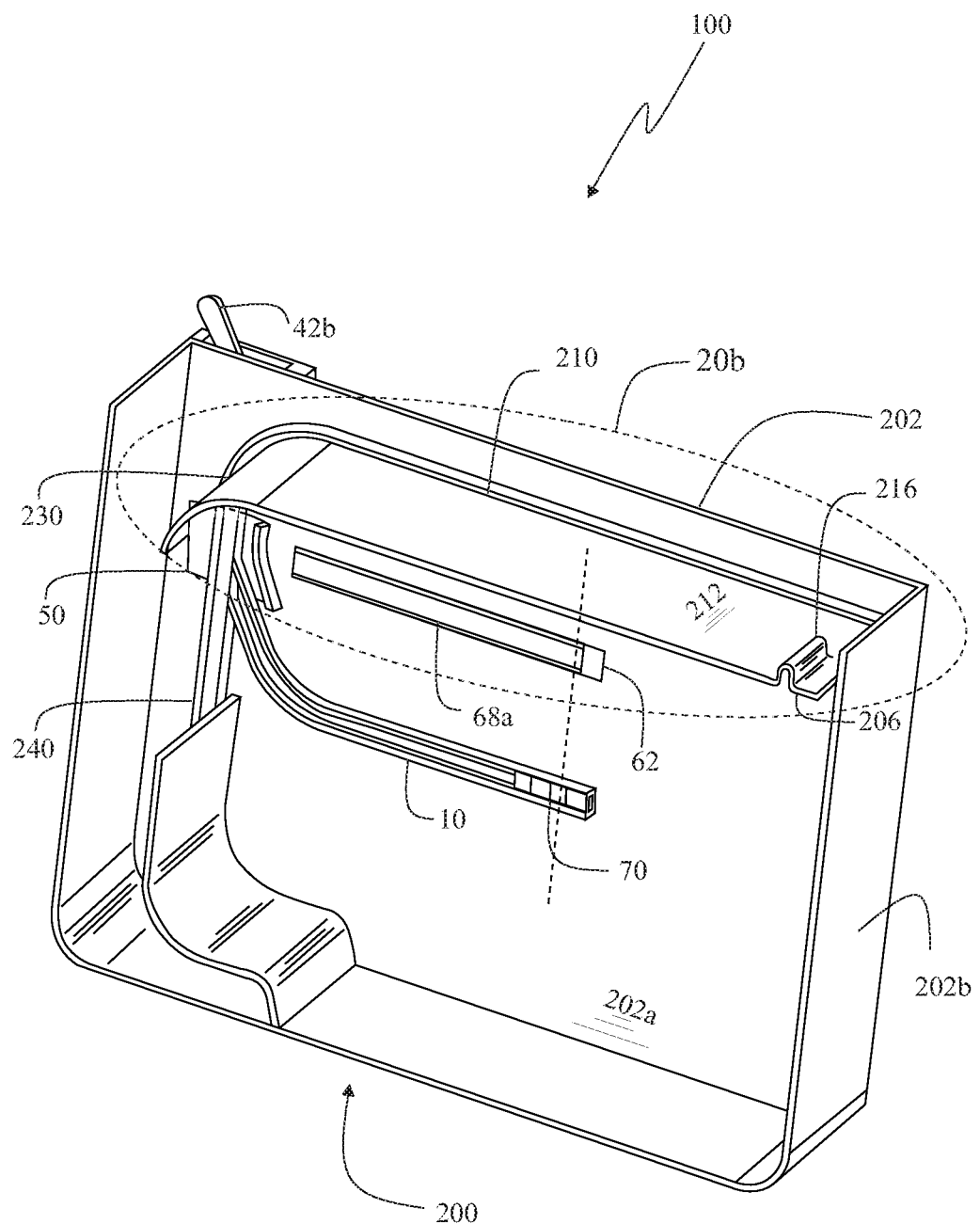
FIG. 1 illustrates a mechanism for holding articles in an enclosure in a closed position in accordance with an embodiment of the invention.
Figure 2:
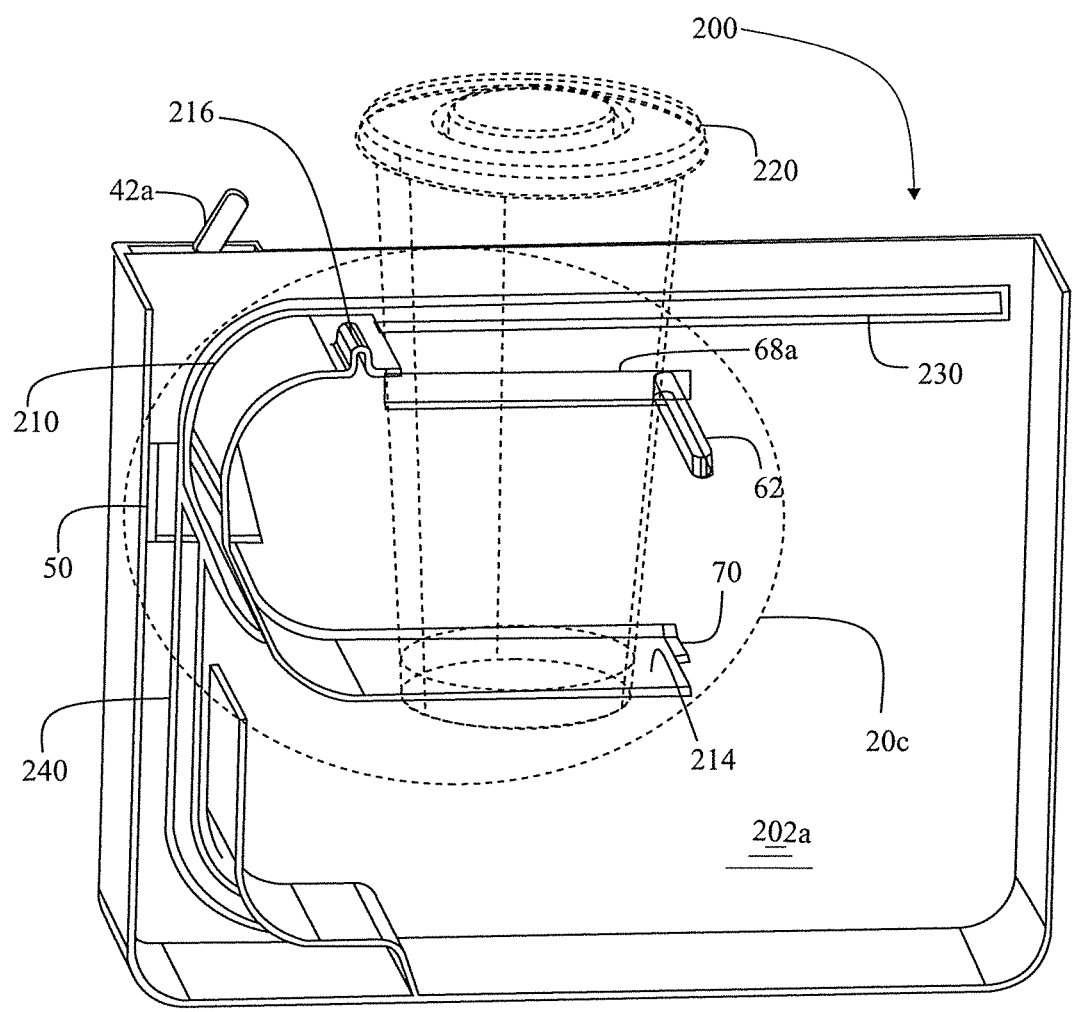
FIG. 2 illustrates the mechanism for holding articles in the enclosure in a holding position in accordance with an embodiment of the invention.
Figure 3:
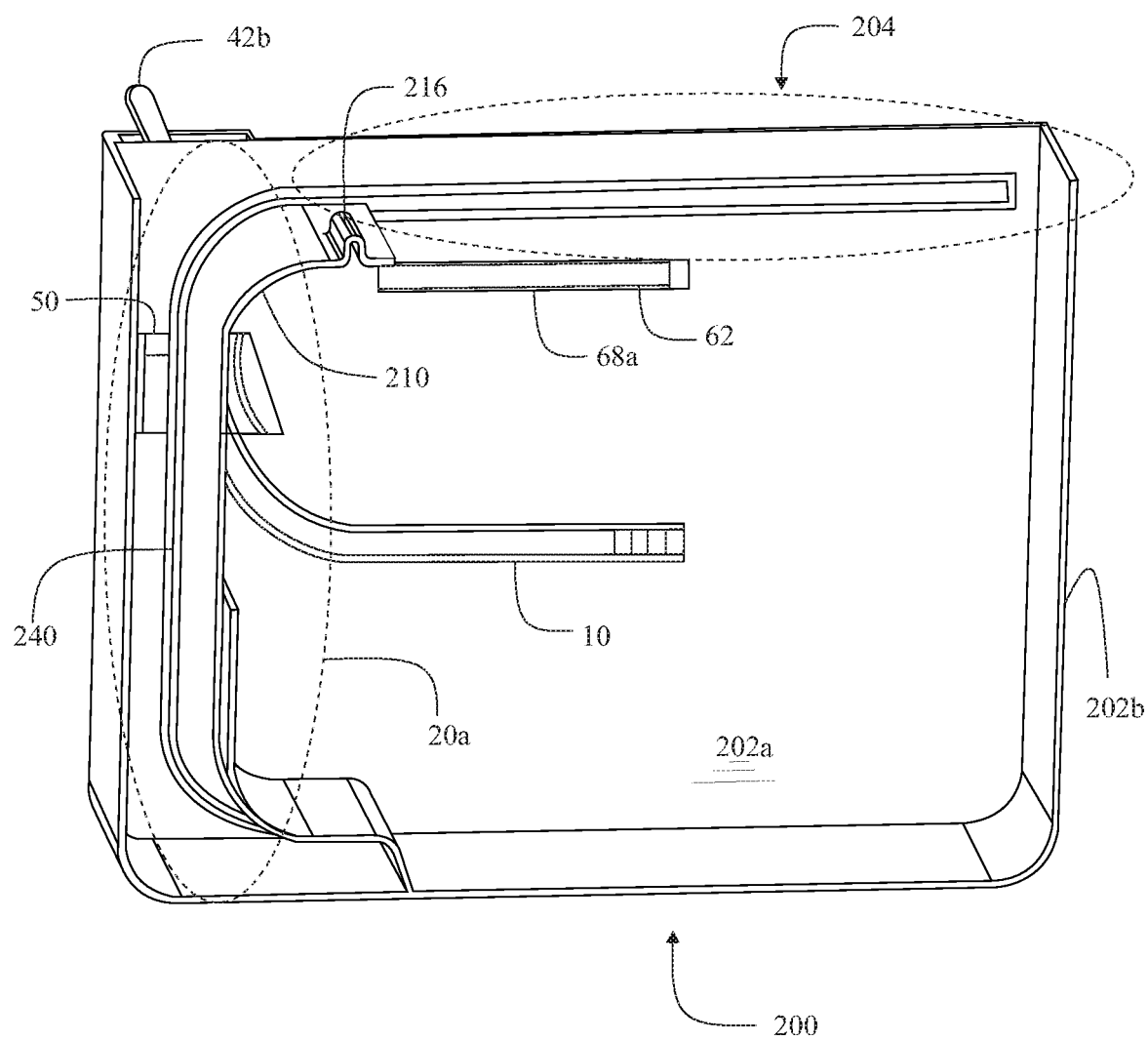
FIG. 3 illustrates the mechanism for holding articles in the enclosure in an open position.

Referring now to FIGS. 1, 2 and 3, a mechanism 100 for holding at least one article 220 in an enclosure 200 in accordance with an embodiment of the invention is illustrated. In the present embodiment, the mechanism 100 is configured to hold one article 220, but it may be obvious to a person skilled in the art to configure the mechanism 100 for holding two, three, four or more articles 220 thereon.

Further, the enclosure 200 includes a sliding cover 210, a first track 230, a second track 240 and a third track 10 configured on a wall 202 of the enclosure 200. Specifically, the first track 230 and the second track 240 are configured on an inner side 202a of the wall 202, it may be obvious to a person skilled in the art to provide other obvious arrangements for configuring such tracks. The sliding cover 210 is configured to slide through the first track 230. The first track 230 guides the sliding cover 210 to an open position 20a (as shown in FIG. 3) and to a closed position 20b (as shown in FIG. 1). Specifically, the open position 20a is configured when the sliding cover 210 slides down over to the second track 240 from the first track 230. The closed position 20b is configured when the sliding cover 210 slides from the second track 240 over to the first track 230 covering an opening 204 of the enclosure 200.

Referring back to FIGS. 1 and 2, the sliding cover 210 has a top portion 212 and a bottom portion 214. The sliding cover 210 has a projection 216 configured at an end portion 206 and extending above thereof in operating configuration. The projection 216 facilitates a user to hold and slide the sliding cover 210 to cover and uncover the opening 204 to configure the closed position 20b and the open position 20a respectively. The projection 216 also restricts movement of the sliding cover 210 beyond an extent in open position 20a thereby preventing further movement of the sliding cover 210 thereafter.

Figure 8:
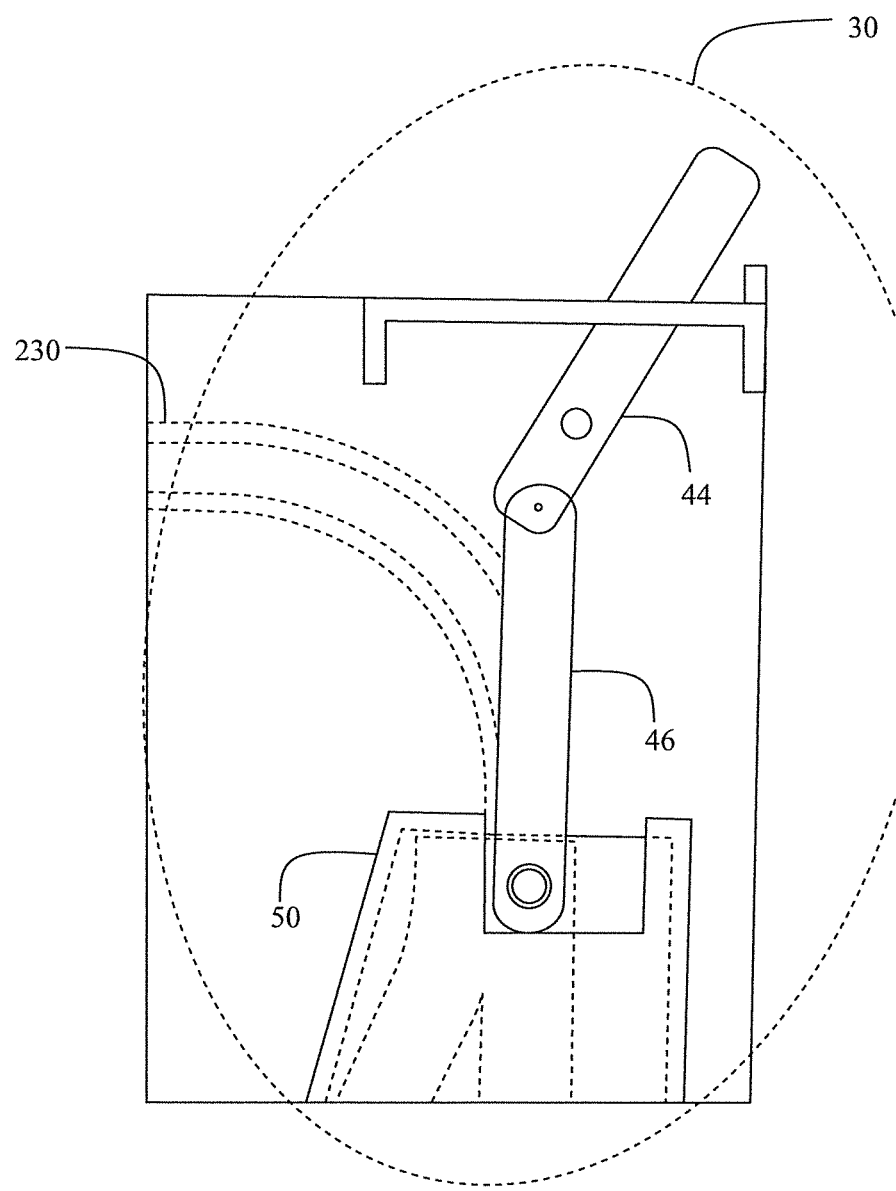
FIG. 8 illustrates the arrangement of the track changing mechanism in the open and closed position.
Figure 9:
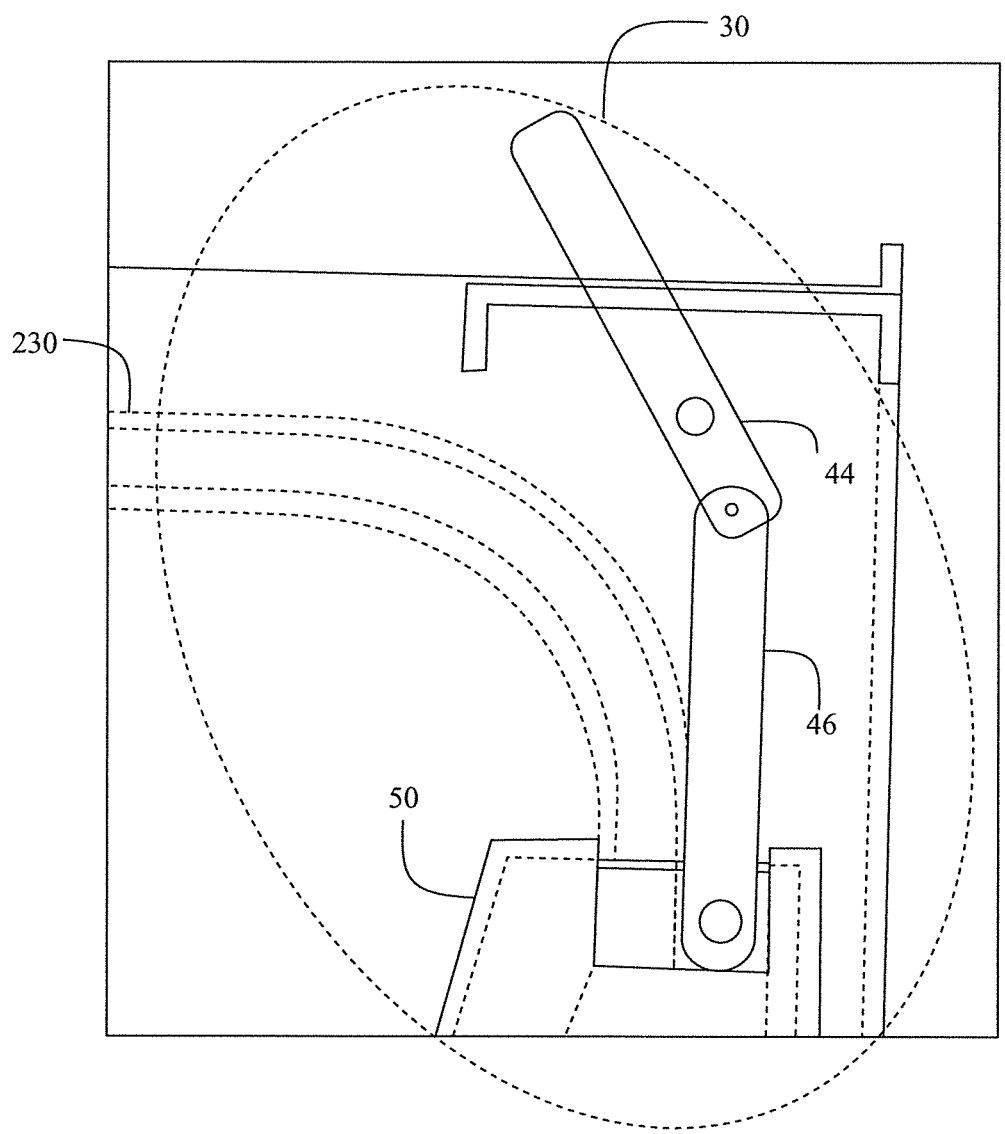
FIG. 9 illustrates the arrangement of the track changing mechanism in the holding position.

Further, the third track 10 is configured on the wall 202 of the enclosure 200, specifically on the inner side 202a of the wall 202. It may be obvious to a person skilled in the art to provide other obvious arrangements for configuring the third track 10. The sliding cover 210 in a holding position 20c holds the article 220 upon engaging and sliding the sliding cover 210 over to the third track 10 (as shown in FIG. 2). The third track 10 is connected to the first track 230 using a track changing mechanism 30 (as shown in FIGS. 8 and 9). The track changing mechanism 30 connects the first track 230 to the second track 240 and to the third track 10. The track changing mechanism 30 is operated to divert the path of the sliding cover 210 from the first track 230 to connect with either the second track 240 or with the third track 10 depending upon storage requirement.

Figure 4:
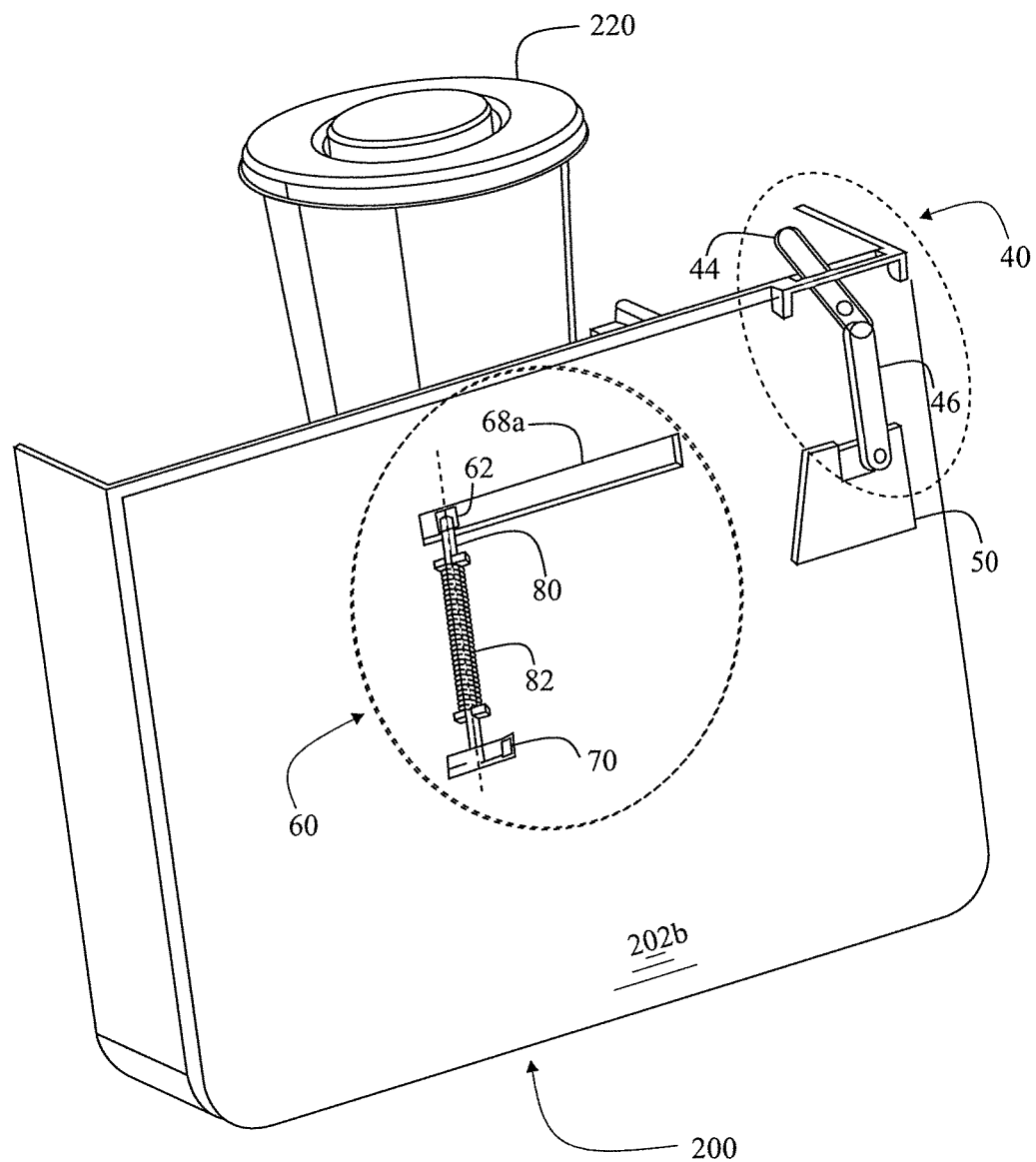
FIG. 4 illustrates the arrangement of a lever and a supporting link in the holding position.
Figure 5:
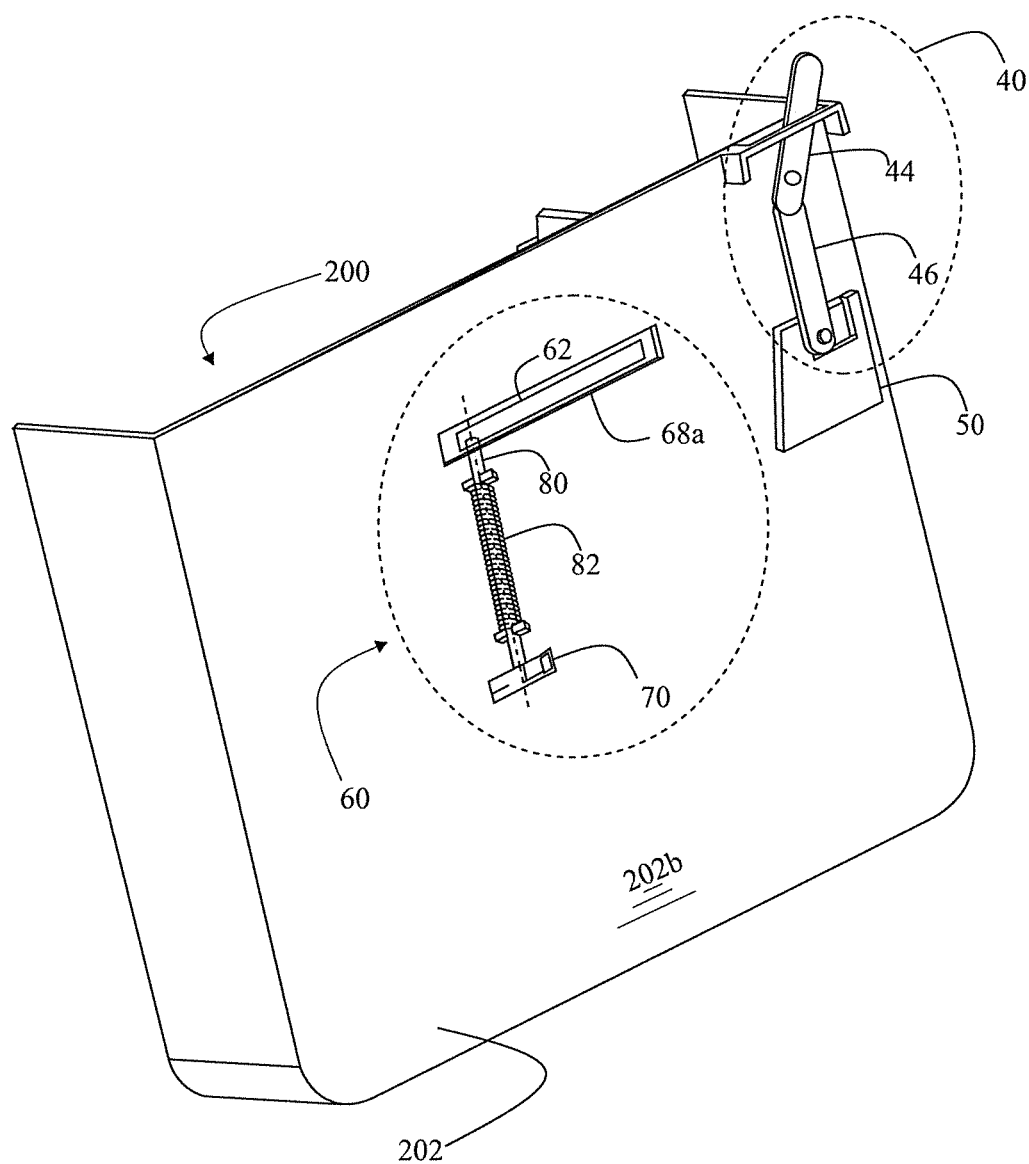
FIG. 5 illustrates the arrangement of the lever and the supporting link in the closed position or in the open position.

Referring to FIGS. 4 and 5, the track changing mechanism 30 includes a lever 40 and a track changing member 50. The lever 40 is arranged on the wall 202 of the enclosure 200, specifically on an outer side 202b of the wall 202. The lever 40 is accessible to the user. The lever 40 can be operated in two different positions, specifically in a first position 42a and in a second position 42b as shown in FIGS. 1, 2 and 3. The first position 42a slides the track changing member 50 to connect the first track 230 with the third track 10. The second position 42b slides the track changing member 50 to connect the first track 230 with the second track 240.

Further, the lever 40 guides the sliding cover 210 to engage with the third track 10 from the first track 230 upon operating the lever 40 to the first position 42a. The lever 40 guides the sliding cover 210 to engage with the second track 240 from the first track 230 upon operating the lever 40 to the second position 42b.

Referring now to FIGS. 4 and 5, the lever 40 includes a first element 44 hinged to the wall 202 of the enclosure 200, specifically to the outer wall 202b of the enclosure 200 and a second element 46 hinged to the first element 44. The first element 44 is arranged vertically on the wall 202 for ensuring easy access for the user. The second element 46 is connected to the track changing member 50. Upon operating the first element 44, the second element 46 moves thereby sliding the track changing member 50.

Further, the track changing member 50 is movably arranged between the first track 230 and the second track 240. In the present embodiment, the track changing member 50 is having two tracks, connecting to the first track 230 and the second track 240 selectively to guide the sliding cover 210 from the first track 230 to the second track 240, and from the first track 230 to the third track 10 and back therefrom. The track changing member 50 connects with either the second track 240 or the third track 10 upon moving the lever 40 to the first position 42a or to the second position 42b respectively. It may be obvious to a person skilled in the art to provide other obvious arrangement to connect the first track 230 with the second track 240 and the third track 10.

Further, referring again to FIGS. 4 and 5, the mechanism 100 includes a supporting link 60 for supporting and preventing lateral movement of the article 220 from the holding position 20c. The supporting link 60 comprises at least one supporting member 62, an operating member 70 and a connecting member 80. In the present embodiment, the supporting link 60 comprises one supporting member 62. The supporting member 62 prevents the lateral displacement of the article 220 on one side and other side of the article 220 is supporting by end 206 of the sliding cover 210 along the sideways ensuring the article 220 to hold in the holding position 20c. The supporting member 62 rest against the wall 202 in the open position 20a and the closed position 20b. In the holding position 20c the supporting member 62 extends inside the enclosure 200 in a perpendicular plane to the wall 202. Also, the supporting member 62 is hinged to the wall 202 at a proximal end.

Further, a first slot 68a is provided on the wall 202 of the enclosure 200. Specifically, the first slot 68a is arranged horizontally to hold the first member 62 in a retracted configuration resting again the wall 202. The supporting member 62 extends out from the wall 202 of the enclosure 200 forming an extended configuration. Specifically, the supporting member 62 extends inside the enclosure 200 in the holding position 20c. It may be obvious to a person skilled in the art to include a plurality of the supporting member 62 to configure the supporting link 60.

Figure 6:
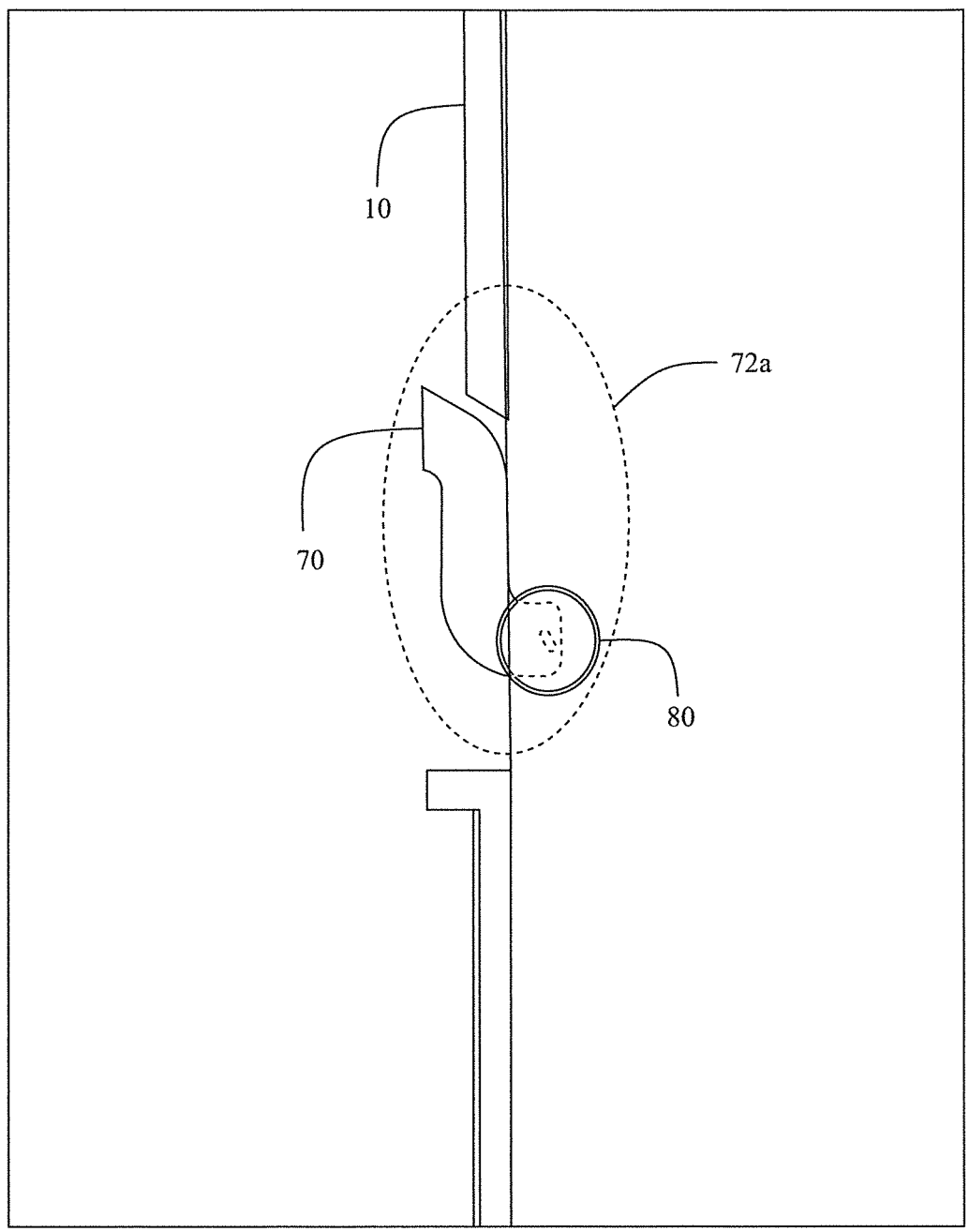
FIG. 6 illustrates a first position of an operating member in the open and closed position.
Figure 7:
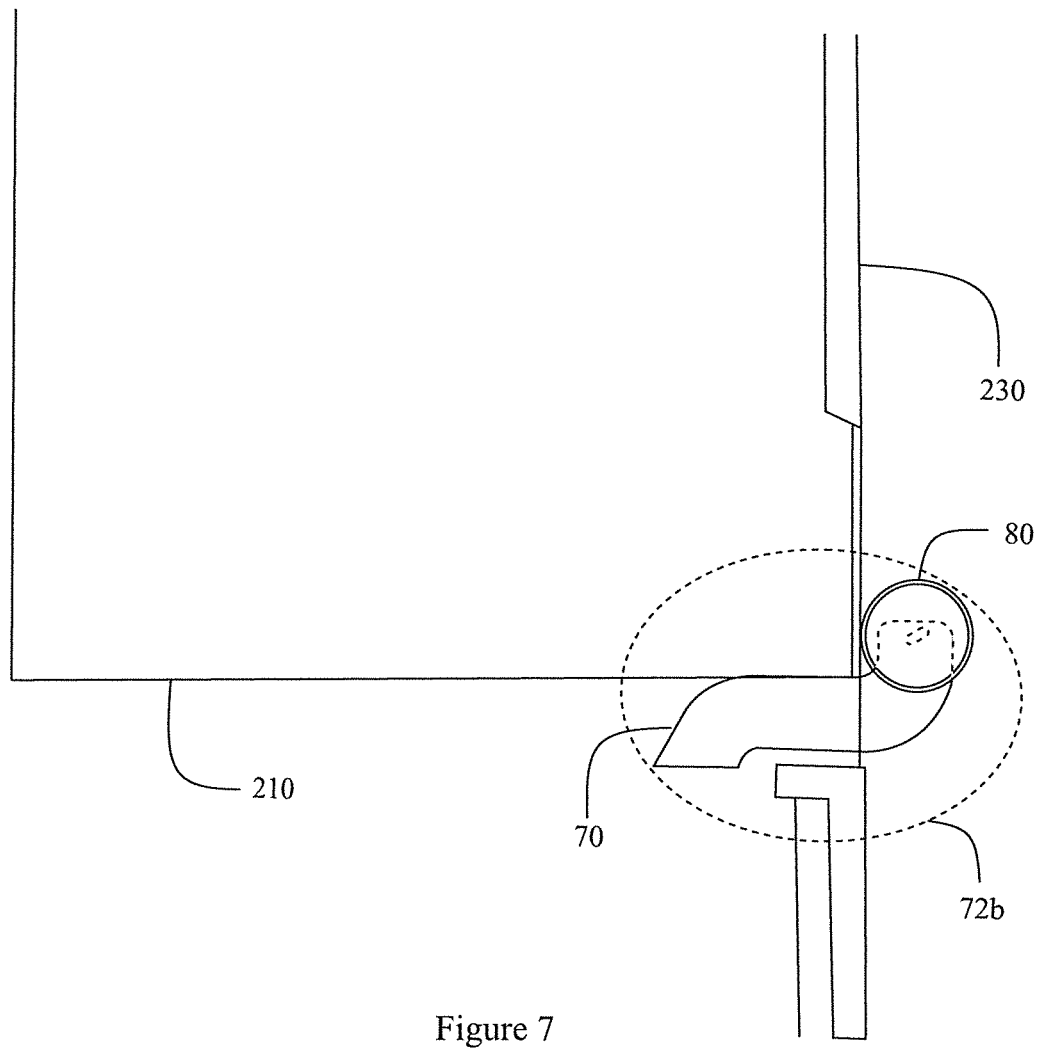
FIG. 7 illustrates a second position of the operating member in the holding position.

Referring again to FIGS. 4, 5, 6 and 7, the operating member 70 is rotatably arranged on the third track 10. The operating member 70 rotates from a first position 72a (as shown in FIG. 6) to a second position 72b (as shown in FIG. 7) upon sliding the sliding cover 210 on the third track 10. Upon sliding the sliding cover 210 over the third track 10, the sliding cover 210 makes contact with the operating member 70 thereby rotating the operating member 70 to the second position 72b. Upon drawing back the sliding cover 210 to the closed position 20b, the operating member 70 comes back to the first position 72a. In the present embodiment, the operating member 70 is arranged horizontally on the third track 10. The operating member 70 is hinged to the wall 202 at a proximal end. The operating member 70 has a curved edge at a distal end facing the sliding cover 210. The covered face provides a cam surface for sliding the sliding cover 210 over thereby turning the operating member 70 and the supporting member 62 in to extend out to configure holding position 20c.

Further, the connecting member 80 connects the operating member 70 with the supporting member 62. The rotation of the operating member 70 rotates the supporting member 62. The connecting member 80 is secured to the operating member 70 and the supporting member 62 around pivotal axis respectively. The connecting member 80 has a biasing member 82 to retract the supporting member 62 and the operating member 70 to rest against the wall 202 upon drawing back the sliding cover 210 from the third track 10. In the present embodiment, the biasing member 82 is a spring. The biasing member 82 is compressed upon rotating the operating member 70 from the first position 72a to the second position 72b. The biasing member 82 relaxes upon drawing back the sliding cover 210 from the third track 10. Further a second slot (not shown in the figure) is provided along the wall 202 of the enclosure 200 for holding the connecting member 80 along the wall 202. Further, the connecting member 80 may be provided vertically along the wall 202 of the enclosure 200.

In an alternative embodiment, the lever 40 is connected to the supporting member 62 of the supporting link 60 to move the supporting member 62 selectively, either in the extended configuration or in the retracted configuration. Upon actuating the lever 40 to the first position 42a, the supporting member 62 moves in the extended configuration. When the lever 40 is in second position 42b, the supporting member 62 moves to the retracted configuration to adapt inside the first slot 68a.

The user moves the lever 40 to the first position 42a to configure the holding position 20c to hold articles such as bottles, cups etc. on the sliding cover 210 of the enclosure 200. Upon pushing the lever 40 to the first position 42a, the track changing member 50 connects the first track 230 to the third track 10. The sliding cover 210 slides through the third track 10 and engages with the operating member 70 of the supporting link 60 thereby rotating the operating member 70. The operating member 70 rotates in the pivotal axis towards the first position 72a and moves the supporting member 62 from the retracted configuration to the extended configuration thereby configuring the holding position 20c. The biasing member 82 attached with the connecting member 80 provides tension to the operating member 70 to come back to the second position 72b upon drawing back the sliding cover 210 to the closed position 20b. When the user requires more space for holding articles, the lever 40 is moved to the second position 42b to configure the open position 20a, providing maximum storage space in the enclosure 200.

Therefore, the mechanism 100 has an advantage of holding articles in a sliding cover of an enclosure. Further, the mechanism 100 reduces the time for storing articles in the enclosure. Also the mechanism 100 utilizes maximum storage space of the enclosure. Furthermore, the mechanism 100 is easy to operate. Furthermore, the mechanism 100 is easy to manufacture.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enable others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present invention.

The invention claimed is:

1. A mechanism for holding at least one article in an enclosure having a sliding cover, a first track located on a wall of the enclosure for holding the sliding cover in a closed position, a second track for guiding the sliding cover thereon into an open position, the mechanism comprising:
   a third track located on the wall for guiding the sliding cover thereon into a holding position; and
   a track changer for selectively connecting the first track to either the second track or the third track;
   wherein, when the sliding cover is slid to the third track, the enclosure is adapted to hold articles therein.

2. The mechanism as claimed in claim 1, further comprising a supporting link for laterally supporting the at least one article to prevent lateral movement of the at least one article when the sliding cover is in the holding position.

3. The mechanism as claimed in claim 2, wherein the supporting link comprises:
   at least one supporting member movably arranged on the wall of the enclosure, the at least one supporting member extending inside the enclosure when the sliding cover is in the holding position and resting along the wall when the sliding cover is in the closed and the open positions;
   an operating member rotatably arranged on the third track, wherein, upon sliding the sliding cover on the third track, the operating member rotates away from the wall and, upon drawing back the sliding cover, the operating member rests along the wall; and
   a connecting member connecting the operating member with the at least one supporting member, wherein, upon rotating the operating member, the at least one supporting member rotates.

4. The mechanism as claimed in claim 3, wherein the operating member is hinged to the wall at a proximal end of the operating member.

5. The mechanism as claimed in claim 3, wherein the at least one supporting member is hinged to the wall at a proximal end of the supporting member.

6. The mechanism as claimed in claim 3, wherein the connecting member is secured to the operating member and the at least one supporting member along respective pivot axes.

7. The mechanism as claimed in claim 3, wherein the connecting member has a biasing member to retract the at least one supporting member and the operating member to rest along the wall upon drawing back the sliding cover from the third track.

8. The mechanism as claimed in claim 3, wherein a slot is provided on the wall to hold the at least one supporting member along the wall.

9. The mechanism as claimed in claim 3, wherein a slot is provided on the wall to hold the connecting member along the wall.

10. The mechanism as claimed in claim 1, wherein the track changer comprises:
    a lever arranged on the wall of the enclosure and accessible to a user; and
    a track changing member connected to the lever, wherein, upon operating the lever, the track changing member selectively connects the first track with the second track or the third track to place the sliding cover in the open position or the holding position respectively.

11. The mechanism as claimed in claim 10, wherein the lever further comprises a first element hinged to the wall and a second element hinged to the first element and connected to the track changing member, wherein, upon operating the first element, the second element moves, thereby selectively sliding the track changing member.

* * * * *